E. O. THOMASON.
VALVE.
APPLICATION FILED MAY 26, 1915.
1,278,520. Patented Sept. 10, 1918.
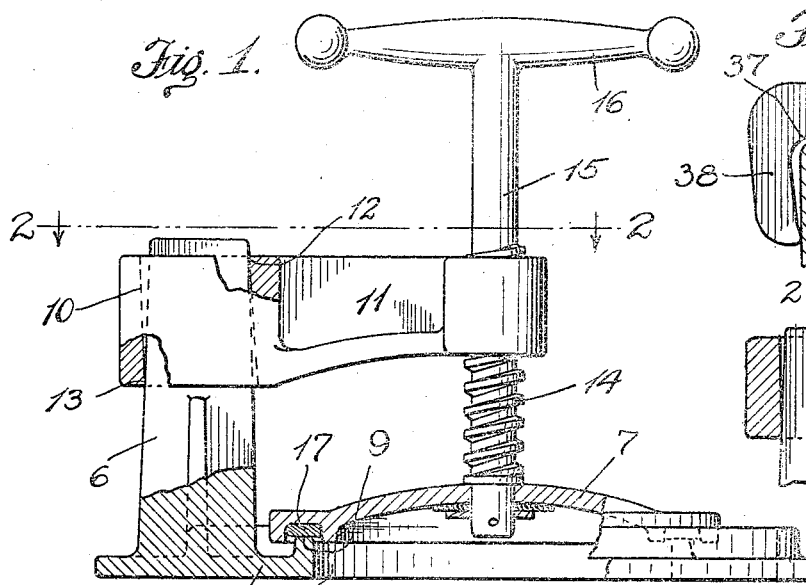
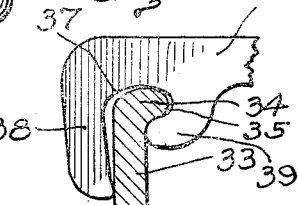
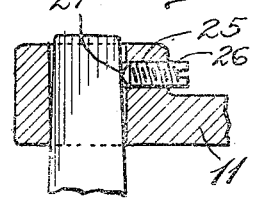
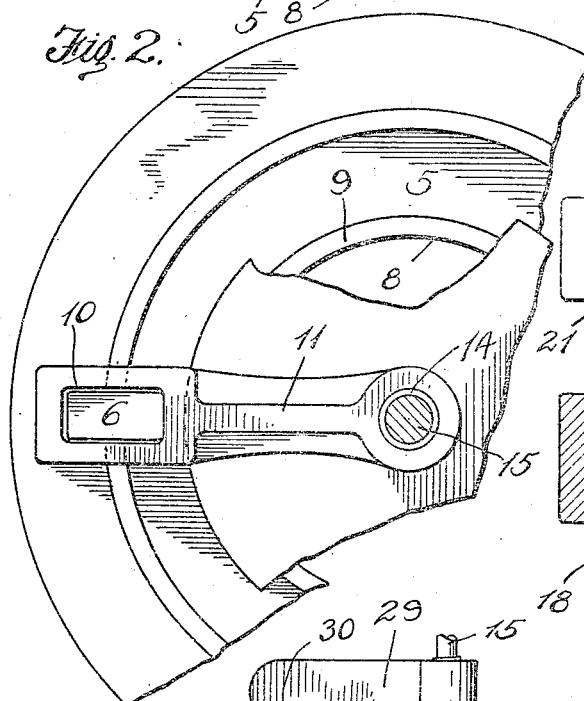
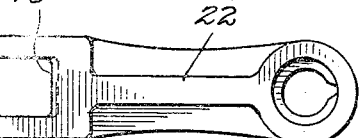
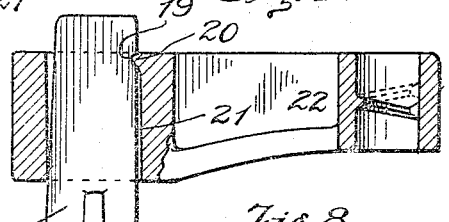
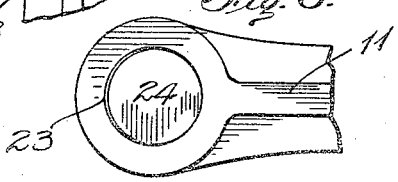
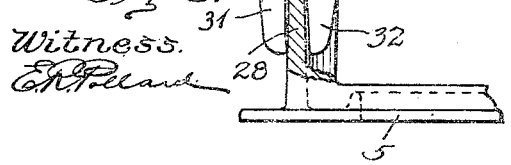
Witness
E. R. Pollard
Inventor
Elmer O. Thomason
By Cassell Severance
Atty.

UNITED STATES PATENT OFFICE.

ELMER O. THOMASON, OF LOS ANGELES, CALIFORNIA, ASSIGNOR TO KELLAR-THOMASON COMPANY, A CORPORATION OF CALIFORNIA.

VALVE.

1,278,520.

Specification of Letters Patent. Patented Sept. 10, 1918.

Application filed May 26, 1915. Serial No. 30,534.

*To all whom it may concern:*

Be it known that I, ELMER O. THOMASON, a citizen of the United States, residing at Los Angeles, in the county of Los Angeles and State of California, have invented certain new and useful Improvements in Valves, of which the following is a specification.

This invention relates to improvements in valves, and particularly to that type of valves that is adapted for use in irrigation systems, and more generally at the open end of pipes, such for instance as the usual stand pipes employed at suitable intervals in irrigation plants or systems.

It is an object of the invention to provide a valve which may be quickly and easily removed from or replaced upon the portion of the valve mechanism carrying the valve seat, the pressure of the valve against said seat being relied upon for holding the valve support tightly in place.

It is also an object of the invention to provide an irrigation valve, having a valve seat ring, with a projection or standard adapted to removably hold a valve carrying member or arm, pressure upon the valve operating to hold said arm in valve retaining position with respect to the valve seat.

It is a further object of the invention to provide a valve mechanism having a suitable valve seat with a quickly removable valve carrying member having a frictional engagement with a projection on the valve seat member of the device, the structure being such that when pressure upon the valve proper is removed the said member can be easily disengaged from its support and removed.

It is a still further object of the invention to provide a valve mechanism with a quickly removable valve supporting arm having a recess or opening adapted to be slipped upon a supporting standard and to be prevented from slipping therefrom by being slightly twisted upon said standard whereby the apertured portion of the arm is caused to bite upon and grip the said standard.

With these and other objects in view the invention comprises certain novel constructions, combinations and arrangements of parts as will be hereinafter more fully described and claimed.

In the accompanying drawing forming a part of this specification:

Figure 1, is a side elevation of the valve mechanism constructed in accordance with the present invention, a portion of the seat ring and the base of the standard, together with a portion of the valve, being broken away and shown in section, to better reveal the structure of the device.

Fig. 2, is a horizontal sectional view taken upon the line 2—2 of Fig. 1 and showing portions of the valve and the seat ring in top plan.

Fig. 3, is a detail view in top plan of the valve supporting member or arm.

Fig. 4, is a detail sectional view through a modified form of valve supporting arm and showing a portion of a modified form of supporting standard.

Fig. 5, is a fragmentary detail view of a modified form of the device showing a valve supporting arm with a flange receiving recess, adapted to fit upon and grip a supporting flange on the seat member of the valve mechanism.

Fig. 6, is a fragmentary detail sectional view similar to Fig. 5, but showing a seat member flange with an enlarged edge or bead portion for holding the supporting arm.

Fig. 7, is a similar detail view but showing an adjustable gripping means upon the valve supporting arm for engaging the standard.

Fig. 8, is a fragmentary detail view of one end of a supporting arm showing a circular opening therein for engaging a cylindrical standard or supporting pin.

The valve of the present invention is designed to afford one which is simple and economical in construction, which is particularly adapted for a quick removal of the valve proper from the seat carrying member of the device, the said member being also as well adapted for a quick return to its valve holding position. It is an important feature of the invention that the valve carrying member fits or grips its support when pressure is exerted upon the valve, the said member merely being moved so as to bind upon its supporting standard or pin. In the accompanying drawing preferred forms of the device have been illustrated and the invention will now be more particularly described, reference being had thereto. In said drawing 5 indicates a seat member or ring, 6 a valve supporting standard rising therefrom and 7 a valve or plate which is adapted to engage the said seat member for controlling the flow of water or other liquids past the device. The seat member 5 is provided with a central opening 8 through which the liquids may pass, around which is arranged a valve seat 9. The valve seat 9 is usually in the form of a flange surrounding the opening 8 and rising a slight distance above the upper surface of the seat member or ring 5. The seat member or ring 5 is made of a suitable diameter to fit in the open end of a pipe or stand pipe, its outer edges being usually cemented or otherwise secured within such pipe.

Rising from the said seat member, usually upon one side thereof is a standard 6, the upper free end of which is made of a proper shape to fit within a socket or opening 10 formed in the end portion of the valve supporting member or arm 11. As shown in Figs. 1 and 2 the upper end of the standard 6 is made rectangular in cross section and the socket or opening 10 is made of a corresponding shape, though of somewhat larger dimensions to render it easy to slip the arm upon or take it from the end of said standard 6. An upward pressure upon the inner end of the arm 11 will move the same so as to cause the upper edge at 12 upon one side of the opening 10 and the lower edge at 13 upon the other side of said opening to bear tightly against the opposite sides of the standard 6, as will be clearly understood by reference to Fig. 1 of the drawing. If the inner and outer walls of the said opening 10 are slightly inclined as shown in Fig. 1, the arm 11 will be in approximately a horizontal position when it has ben moved so as to bind upon and grip the standard or post 6.

The inner end of the arm 11 is provided with a screw threaded opening 14 adapted to receive and fit upon the threaded portion 14 of the valve stem 15. The upper end of said valve stem is provided with an operating handle 16 by which it may be turned. The lower end of the valve stem 15 has a swivel engagement with the valve 7. The said valve 7 may be made in any ordinary or desired form and usually carries packing or gasket material as at 17 for engaging the seat 9 and making a tight joint to prevent the passage of materials through the opening 8, when the valve is closed.

In making valve mechanisms of this character, and especially where they are to be used in irrigation systems, the threaded portion of the valve stem is somewhat loose in the threaded portion 14 of the arm 11, so that the said arm may rock slightly upon the upper end of the standard 6 for gripping the same or releasing the same, without materially binding upon the threads of the screw. The structure is such that when it is desired to put the valve in place, it is only necessary to slip the opening 10 of the arm 11 upon the upper end of the standard 6, after which the valve stem 15 is turned to force the valve 7 against the seat 9. This will tend to raise the inner end of the arm 11 causing the said arm to bind upon and grip the said standard 6. Of course any additional pressure against the valve 7 by liquids or water within the pipe only tend to cause the said arm to grip the standard 6 more firmly. When it is desired to open or remove the valve, the valve stem 15 is turned so as to lift the valve from the seat 9 and in this way the arm 11 is loosened upon the standard 6 and the outer end can be lifted from the standard. The said arm 11 with the valve stem and valve may be lifted entirely off from the seat member of the device.

It will be evident that the details of construction may be considerably varied and modified without departing in the least from the spirit of the invention. Thus as shown in Fig. 4 a standard 18 may be employed which is provided with a notch 19 adapted to receive and be engaged by a lip or projection 20 formed in the upper inner edge of the opening 21 provided in the modified form of arm 22, which is disclosed in Fig. 4 of the drawing. The opening 21 is large enough to permit the arm to be easily slipped upon the end of the standard 18, and so that the small projection or lip 20 will come opposite the notch 19, after which the upward rocking of the inner end of the arm, due to the seating of valve will carry the lip 20 into said notch 19, positively fastening the arm upon said standard 18.

It will also be evident that a valve carrying arm having a circular or cylindrical opening, as at 23 may be employed, within the spirit of the invention and be adapted to slip loosely upon the end of a cylindrical standard or supporting pin as at 24. When the said arm is rocked as above described, by reason of the pressure on the valve, the recess 23 will be moved upon the standard 24 so as to grip the same, just as described with respect to the form of the device shown in Fig. 1.

As shown in Fig. 7 one of the biting edges of the opening or socket in either form of the arm above described may be provided with an adjustable biting or gripping member. In this instance a threaded opening 25 is formed in the standard engaging end of the arm and an adjustable screw 26 is mounted therein, the inner end of said screw being pointed as at 27 for biting and obtaining a firm hold upon the standard when the arm is slipped upon the same, and rocked upwardly by the pressure of the valve. It will be readily understood that by adjusting the screw 26 a nicer fit may be had upon the standard and any enlargement of the opening in the arm by reason of rust or corrosion may be compensated for by the adjustment of the said screw 26.

The engagement between the valve supporting arm and the seat member of the valve mechanism may be further modified within the spirit and scope of this invention. Thus as shown in Fig. 5 the standard upon the seat member, may be made in the form of an upward flange extension 28, and the arm as 29 may be provided with a downwardly projecting portion having a slot or kerf 30 therein adapted to receive the upper edge of said flange 28. The arm 29 is thus provided with gripping jaws 31 and 32 which bite upon and grip the said flange 28 when the inner end of the arm is forced upwardly by screwing the valve tightly upon its seat. It will be readily understood of course that the flange 28 may extend a part way, or entirely around the seat plate or ring as found most desirable. As shown in Fig. 6 a standard flange 33 may also be employed which is provided with an enlarged bead portion 34 forming a rib at 35 adapted to engage the valve carrying arm 36. In this instance the slot 37 in the said arm 36 is made of the proper shape to fit upon the edge of the said standard 33. Gripping jaws 38 and 39 are thus afforded for receiving and binding upon the upper beaded edge of the standard 33. The end of one of said jaws, preferably the jaw 39 will thus project underneath the bead or rib 35 and prevent the arm from becoming disengaged from the said standard 33, especially when the valve is forced tightly against its seat.

It will be evident also that further modifications may be made in embodying the invention in particular devices without departing in the least from the scope of this invention.

A valve mechanism of the kind above described is especially useful in the open upper ends of the usual vertical stand pipes employed in irrigation systems, where it is sometimes desirable to open the valve only slightly to allow a small stream of water to flow from the said stand pipe. At other times it is desirable to entirely remove the valve so as to obtain the full unobstructed flow of water from the stand pipe. When the valve has been thus removed, it is also desirable to be able to easily and quickly replace the valve while the water is flowing. Any of the forms of the device above described are admirably adapted for stand pipes in the irrigation systems which employ piping or conduits.

What is claimed is:

1. A valve mechanism comprising a valve supporting member, a valve proper and a valve carrying arm having an opening in one end adapted to engage a portion of the seat member with a frictional engagement, the friction being increased by the seating of the valve, carried by its other end.

2. A valve mechanism comprising a supporting member having a projection thereon, a cantaliver valve carrying arm having an opening provided with a gripping edge adapted to receive said projection and obtain a hold thereon, a valve stem carried by said arm and a valve proper carried by said stem, the arm being caused to grip the said projection when said arm is pried outwardly as the valve is seated, but being easily removable therefrom when the valve is unseated.

3. A valve mechanism comprising a support, a valve carrying member having an adjustable gripping means at one end for engaging said support and a valve on its other end, adapted to be held in seated position thereby.

4. A valve mechanism having a valve supporting standard provided with a holding projection, an arm having a lip adapted to engage said projection for holding the arm in place and an adjustable valve carried by one end of said arm.

5. A valve mechanism comprising a seat plate having a projection extending from one face thereon, a supporting arm having a recess adapted to fit over said projection and a valve carried by the free end of said arm, whereby the seating of the valve may rock the arm sufficiently to cause it to bind upon the support.

6. A valve mechanism comprising a seat plate having a supporting flange rising therefrom, a supporting arm having a recess adapted to fit upon said flange and a valve carried by one end of said arm and having means for forcing it against its seat whereby the arm is pried outwardly so as to bite upon and grip said flange.

7. A valve mechanism comprising a seat plate having a supporting flange rising therefrom, said flange being provided with a holding enlargement upon its edge, an arm having jaws at one end adapted to grip said edge and an adjustable valve carried by the other end of said arm.

In testimony whereof, I have hereunto set my hand, in presence of two witnesses.

ELMER O. THOMASON.

Witnesses:
   CASSELL SEVERANCE,
   EARLE R. POLLARD.

Copies of this patent may be obtained for five cents each, by addressing the "Commissioner of Patents, Washington, D. C."